Sept. 25, 1962     R. C. INGWERSEN     3,056,010
CIRCUIT BREAKER AND PANEL ASSEMBLY
Filed Oct. 27, 1958

INVENTOR.
Richard C. Ingwersen
BY
Harness, Dickey & Pierce
ATTORNEYS

United States Patent Office 3,056,010
Patented Sept. 25, 1962

3,056,010
CIRCUIT BREAKER AND PANEL ASSEMBLY
Richard C. Ingwersen, Jackson, Mich., assignor, by mesne assignments, to Mechanical Products, Inc., a corporation of Michigan
Filed Oct. 27, 1958, Ser. No. 769,710
1 Claim. (Cl. 200—168)

This invention relates to electrical circuit breakers and/or switches and more particularly to an improved arrangement for mounting a circuit breaker on a panel so as to provide an improved panel and circuit breaker assembly.

Modern aircraft employ a large number of circuit breakers and/or switches and most of these are assembled with panels in the aircraft interior so that the actuating members thereof, in the form of plungers, toggles, etc., which project through openings in the panels may be quickly and easily actuated by an aircraft pilot or engineer. One of the important factors in aircraft design and construction is to keep the weight and size of all components in the aircraft to a minimum. This is particularly true in connection with electrical equipment such as circuit breakers and switches because of the large number of such devices which are used.

In the past, circuit breakers have been mounted either on structural members disposed behind the instrument panel through which the circuit breaker actuator extends or the circuit breakers have been mounted directly on an instrument panel, in which event it has been necessary to connect terminals at the back of the circuit breakers to wires or bus bars of electrical circuits.

It is an object of this invention to provide an improved panel and circuit breaker assembly which is lighter in weight and requires less space than previous types of circuit breaker and panel assemblies. This is accomplished in this invention by an improved panel construction as well as a unique and improved circuit breaker and/or electrical switch construction.

It is a still further object of this invention to provide an improved circuit breaker and/or switch which can be mounted to a panel as set forth above and which is extremely compact in size and weight and efficient in operation.

Figure 1:
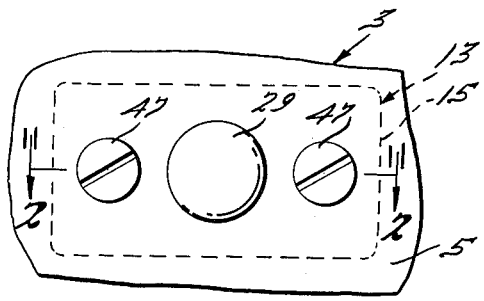
Figure 2:
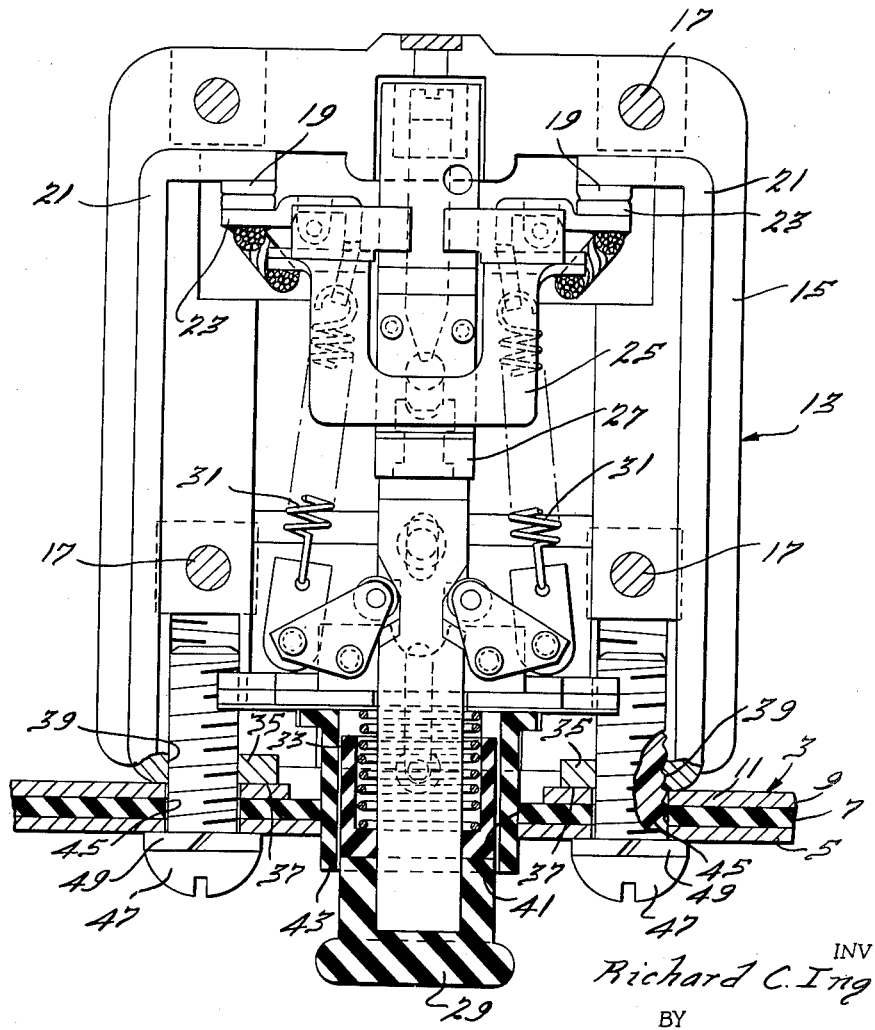

These and other objects of the present invention will become apparent from the following detailed description taken in conjunction with the accompanying drawing in which:

FIGURE 1 is a fragmentary front elevational view of a portion of a panel on which a circuit breaker of this invention is mounted; and FIG. 2 is an enlarged sectional view of the structure illustrated in FIG. 1, taken along the line 2—2 thereof.

Referring now to the drawing, it will be seen that a panel, such as an instrument panel in an aircraft or the like, is generally indicated at 3, and the particular panel illustrated is of a laminated type having an outer metallic plate or layer 5, an intermediate layer 7 of insulating material such as paper, plastic material or the like and an inner layer or plate 9 which is normally a metal such as copper which has been etched to provide electrically conductive paths or portions 11. In a broad sense, the panel portion 9 may be termed a "printed circuit," although in the particular illustrated arrangement, the electrical paths or wires are actually provided by etching away the adjacent metal of the layer or plate 9. In this way, a compact panel assembly 3 is provided in which the electrical circuitry is laminated with the front face of the panel and is insulated therefrom by a layer of suitable insulating material. Thus, the laminated panel serves several functions for which individual elements were previously needed, and therefore weight and space saving is effected.

An electric switch 13 of the type having automatic overload circuit breaker characteristics is illustrated as being mounted on the panel and electrically connected with the electrical conductive paths 11 of the panel. While the internal construction of the circuit breaker plays no particular part in this invention, an operating mechanism will be described for the purposes of clarity of understanding. It should also be noted that while hereinafter reference is made to a circuit breaker, it is to be understood that such language refers as well to an electric switch having circuit breaker characteristics.

The electric circuit breaker has a two-piece hollow housing 15 made of an electrically nonconductive or insulating material such as a suitable plastic or the like and the two halves are connected together by suitable screws 17 after the internal circuit breaker parts have been assembled in one of the housing halves. The internal circuit breaker parts illustrated herein are generally and functionally substantially the same as those illustrated and described in United States Letters Patent No. 2,831,086, issued April 15, 1958, and assigned to the assignee of the present invention, and it is felt that it is sufficient for the purposes of this application to point out that a pair of stationary contacts 10 are provided which are connected to terminals 21, the nature of which will be described in detail hereinafter. Movable contacts 23, which are adapted to move toward and away from the stationary contacts 19, are supported by bi-metallic elements 25 on a plunger assembly 27, the outer end of which terminates in a button 29 which projects beyond one end of the housing 15 and is movable relative thereto. By pulling outwardly on the button 29, the contacts 23 may be manually moved out of engagement with the stationary contacts 19 so that no current may flow through the circuit breaker. Likewise, by pushing inwardly on the button 29, the contacts 23 may be moved into engagement with the contacts 19, as illustrated in FIG. 2, so that a current can flow from one terminal 21, through one set of contacts 19 and 23, through the bi-metallic elements 25, the other set of contacts 19 and 23, to the opposite terminal 21. In the event that the circuit in which the circuit breaker is connected is overloaded, the bi-metallic elements 25 will heat and expand and will be moved relative to the plunger assembly 27 by springs 31 so as to break the current flow through the circuit breaker. Upon such downward movement of the contacts 23, a spring 33 will push the plunger and thus the button 29 outwardly to indicate that the circuit breaker is in its nonconductive position. Thereafter, the circuit breaker may be closed by pushing inwardly on the button 29 so as to move the contacts 23 back into engagement with the contact 19, all as described in said United States Letters Patent No. 2,831,086.

By referring to FIG. 2 of the drawing, it will be noted that the terminals 21 extend through the housing 15, from the upper or back end of the circuit breaker to the front end thereof, adjacent to, and on opposite sides of the plunger button 29. The outer ends of the terminals 21 are bent laterally inwardly to provide end portions 35 which have front faces 37 disposed in a common plane and extending parallel to the front face of the housing and the rear face of the panel assembly 3. The end portions 35 of the terminals are drilled and tapped so as to provide tapped holes 39 adapted to threadably receive screws or bolts.

The circuit breaker 13 is mounted to the panel 3 by pushing the front end of the circuit breaker against the rear face of the panel 3 so that the front faces 37 of the terminal end portions 35 engage the wire paths of the panel printed circuit portion 11. The panel 3 is provided with an aperture 41 through which the circuit breaker plunger button 29 and its surrounding collar 43 project so that the button is visible and actuatable from the front of the panel. It should be noted that while an "in" and "out" plunger button arrangement is illustrated, other types of actuating members, such as toggles or the like, could be employed without departing from the scope of this invention.

The panel 3 is also provided with apertures 45 which are in alignment with the apertures 39 in the circuit breaker terminal end portions 35. Screws 47, which are made of an electrical nonconductive material such as "nylon" or the like, are inserted through the front of the panel and threaded into the circuit breaker terminal end portion apertures 39 and tightened so as to securely mount the circuit breaker on the panel. Washers 49 may be provided, if desired, between the heads of the screws and the panel front face.

It will thus be seen that the circuit breaker is securely mounted to the panel and is insulated therefrom except for the engagement of the circuit breaker terminals with the electrical conductive circuitry on the back face of the panel, and it will be appreciated that this unique mounting arrangement eliminates the necessity of additional supporting structure for supporting the circuit breaker on the panel and eliminates the need of wires or bus bars to connect the circuit breaker into the electrical circuit. Thus, material space, weight and size savings are like, and a real step forward in the art is attained.

What is claimed is:

A panel having electrical conductive means on one face thereof, an electric circuit breaker mounted on said one face of said panel and connected with said conductive means, said circuit breaker including a housing of insulating material and an actuating member projecting beyond one end of said housing and movable relative thereto for conditioning said circuit breaker, said panel having an aperture therein through which said circuit breaker actuating member extends, said circuit breaker including a pair of electrical terminals projecting beyond said one end of said housing on opposite sides of said actuating member, said terminals having the end portions thereof extending generally parallel to said panel face and in engagement with said panel electrical conductive means, and a screw made of electrical insulating material extending through said panel and into engagement with each of said terminals so as to mount said circuit breaker on said panel.

References Cited in the file of this patent

UNITED STATES PATENTS

| | | |
|---|---|---|
| 2,066,511 | Arlt | Jan. 5, 1937 |
| 2,207,160 | Rivers | July 9, 1940 |
| 2,740,023 | Krider | Mar. 27, 1956 |
| 2,759,058 | Winter et al. | Aug. 14, 1956 |
| 2,796,497 | Barden | June 18, 1957 |
| 2,812,407 | Budd | Nov. 5, 1957 |
| 2,892,992 | Grovemiller et al. | June 30, 1959 |
| 3,001,165 | Woofter et al. | Sept. 19, 1961 |